United States Patent
Potter (10) Patent No.: US 8,777,789 B2
(45) Date of Patent: Jul. 15, 2014

(54) SPLIT AXIS TRANSMISSION HYBRID SYSTEM ARCHITECTURE

(75) Inventor: James Potter, Novi, MI (US)

(73) Assignee: ZF Friedrichshafen AG, Friedrichshafen (DE)

(*) Notice: Subject to any disclaimer, the term of this patent is extended or adjusted under 35 U.S.C. 154(b) by 231 days.

(21) Appl. No.: 13/343,363

(22) Filed: Jan. 4, 2012

(65) Prior Publication Data

US 2013/0172140 A1 Jul. 4, 2013

(51) Int. Cl.
*F16H 3/72* (2006.01)
*F16H 37/06* (2006.01)

(52) U.S. Cl.
USPC ............................ 475/5; 475/302; 74/331

(58) Field of Classification Search
USPC .............. 475/5, 302; 74/330, 331, 335, 340
See application file for complete search history.

(56) References Cited

U.S. PATENT DOCUMENTS

| | | | | |
|---|---|---|---|---|
| 6,251,037 B1* | 6/2001 | Baumgaertner et al. | ........ | 475/2 |
| 6,558,283 B1* | 5/2003 | Schnelle | ........ | 475/5 |
| 6,852,054 B2* | 2/2005 | Tumback et al. | ........ | 475/5 |
| 7,001,297 B2* | 2/2006 | Shimizu et al. | ........ | 475/5 |
| 7,537,539 B2* | 5/2009 | Antonov et al. | ........ | 475/218 |
| 7,628,720 B2* | 12/2009 | Sakamoto et al. | ........ | 475/5 |
| 8,251,848 B2* | 8/2012 | Murakami et al. | ........ | 475/5 |
| 8,585,522 B2* | 11/2013 | Kaltenbach et al. | ........ | 475/5 |
| 8,597,149 B2* | 12/2013 | Potter | ........ | 475/219 |
| 2002/0033059 A1* | 3/2002 | Pels et al. | ........ | 74/329 |
| 2003/0069103 A1* | 4/2003 | Ibamoto et al. | ........ | 475/5 |
| 2008/0176695 A1* | 7/2008 | Janson et al. | ........ | 475/5 |

* cited by examiner

*Primary Examiner* — Roger Pang
(74) *Attorney, Agent, or Firm* — Brinks Gilson & Lione (57) ABSTRACT

A split-axis transmission hybrid system may include two planetary gear sets to provide two parallel torque paths from an input axis to an output axis. A secondary power source may be coupled to either the input axis or the output axis to provide torque to the system. Thus, the split-axis transmission hybrid system may provide the ratio preselection capability and the low power losses of a dual-clutch transmission and the ratio-changing control and smoothness of a traditional powershift automatic transmission, while also providing the improved efficiency and enhanced drivability of a hybrid power source arrangement.

14 Claims, 10 Drawing Sheets

SPLIT AXIS TRANSMISSION HYBRID SYSTEM ARCHITECTURE

BACKGROUND OF THE INVENTION

1. Field of the Invention

The invention relates to transmissions. In particular, the invention relates to split-axis hybrid transmissions for vehicles.

2. Related Art

Transmissions provide varying torque ratios between power sources, such as engines or motors, and the drive axles to provide efficiency and higher performance in vehicles. Previously known transmissions inherently include many sources of power loss and inefficiency. Manual transmissions lose power during gear ratio changes while the engine or motor is disengaged when the transmission elements are shifted to the next desired gear ratio. Automated mechanical transmissions improved on manual transmission by automatically determining when a gear shift would be advantageous. However, most automated mechanical transmissions, like manual transmissions, lose power during shifting when the transmission must first shift into neutral before changing the gear ratio.

The powershift automatic transmission is an improvement over traditional automatic mechanical transmissions in that it does not require decoupling the power source during a gear ratio change. Nonetheless, powershift automatic transmissions still suffer from power losses associated with released multi-plate clutches and pumping losses for lubrication and clutch actuation flow.

The dual-clutch transmission reduces the overall ratio changing time relative to an automated manual transmission, since an overlap can be performed during the shift, which results in less disturbance of torque during a shift. When the transmission shifts to the next gear ratio, one clutch disengages the transmission from the current gear while the other clutch engages the transmission in the target gear. Thus, power flows almost constantly from the drive mechanism to the wheels of the vehicle. Dual-clutch transmissions have the advantages of using a smaller oil pump and eliminating the multi-plate clutches used in a powershift automatic transmission. These two differences provide reductions in parasitic losses. However, dual-clutch transmissions are only able to preselect one gear ratio at a time. If the transmission incorrectly predicts the next gear ratio, then excessive delays in the shift event may occur, and the transmission may be forced to remain in neutral or the incorrect gear ratio for an extended period of time. This results in reduced performance and driveability.

Thus, there is a need for a highly efficient, cost-effective transmission with improved capabilities for preselecting a target gear and for minimizing torque interruption during a gear change.

SUMMARY OF THE INVENTION

The descriptions below include apparatuses for transmitting torque from an input axis to an output axis at different gear ratios, where the torque is supplied from a primary power source or secondary power source. A split-axis transmission hybrid system may include two planetary gear sets to provide two parallel torque paths from an input axis to an output axis. A secondary power source may be coupled to either the input axis or the output axis to provide torque to the system. Thus, the split-axis transmission hybrid system may provide improvements in preselecting a target gear, minimizing torque interruption during a gear change, and improving vehicle efficiency and drivability.

According to one embodiment of the invention, the transmission comprises a first planetary gear set providing at least part of a first torque path from an input shaft to an output shaft; a second planetary gear set connected in parallel with the first planetary gear set and providing at least part of a second torque path from the input shaft to the output shaft; a plurality of gears configured to transmit torque selectively from the first torque path to the output shaft, and to transmit torque selectively from the second torque path to the output shaft; and a secondary input shaft coupling with the input shaft configurable to couple a secondary power source to the input shaft.

According to another embodiment of the invention, the transmission comprises a first planetary gear set providing at least part of a first torque path from an input shaft to an output shaft; a second planetary gear set connected in parallel with the first planetary gear set and providing at least part of a second torque path from the input shaft to the output shaft; a plurality of gears configured to transmit torque selectively from the first torque path to the output shaft, and to transmit torque selectively from the second torque path to the output shaft; and a secondary output shaft coupling with the output shaft configurable to couple a secondary power source to the output shaft.

According to another embodiment of the invention, the transmission comprises a first planetary gear set providing at least part of a first torque path from an input shaft to an output shaft; a second planetary gear set connected in parallel with the first planetary gear set and providing at least part of a second torque path from the input shaft to the output shaft; a plurality of gears configured to transmit torque selectively from the first torque path to the output shaft, and to transmit torque selectively from the second torque path to the output shaft; and a secondary first torque path coupling with the first torque path configurable to couple a first secondary power source to the first torque path.

According to another embodiment of the invention, a method of operating a transmission having first and second parallel, alternative torque paths between an input shaft and an output shaft, with a coupling for a primary power source with the input shaft and a coupling for a secondary power source with the input shaft, where the method comprises the steps of coupling a secondary power source to the input shaft; engaging a first planetary gear set to transmit torque along the first torque path; providing torque to the input shaft from the secondary power source; determining a change in a target transmission gear ratio; disengaging the first planetary gear set; and engaging a second planetary gear set to transmit torque along the second torque path.

According to another embodiment of the invention, a method of operating a transmission having first and second parallel, alternative torque paths between an input shaft and an output shaft, with a coupling for a primary power source with the input shaft and a coupling for a secondary power source with the output shaft, where the method comprises the steps of coupling a secondary power source to the output shaft; engaging a first planetary gear set to transmit torque along the first torque path; providing torque to the output shaft from the secondary power source; determining a change in a target transmission gear ratio; disengaging the first planetary gear set; and engaging a second planetary gear set to transmit torque along the second torque path.

Other systems, methods, features and advantages will be, or will become, apparent to one with skill in the art upon examination of the following figures and detailed description.

It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION

Figure 1:
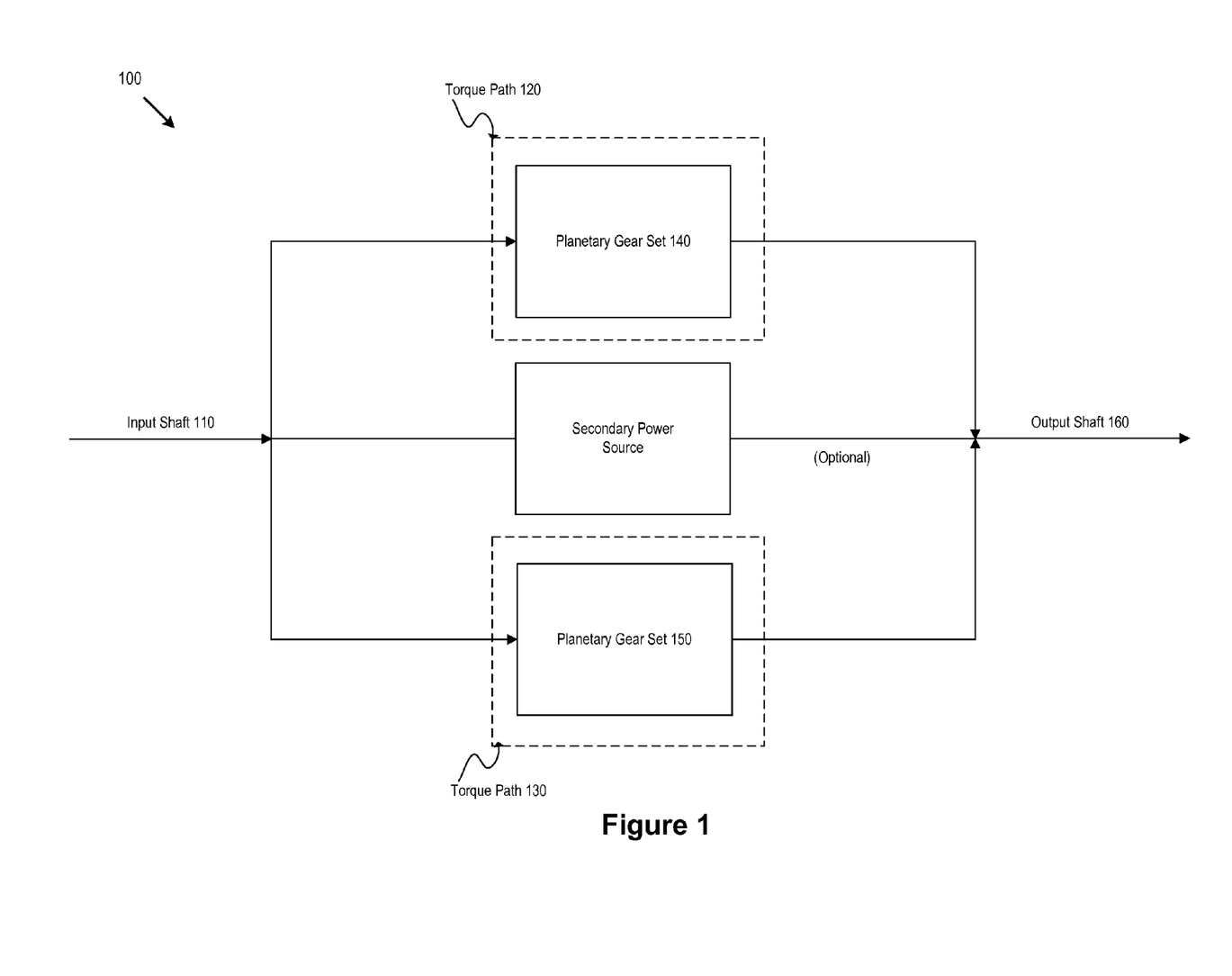
FIG. 1 is a block diagram of a split-axis transmission hybrid system according to one embodiment of the invention.

FIG. 1 shows a block diagram of a split-axis transmission hybrid system 100, including an input shaft 110 and an output shaft 160, according to an embodiment of the invention. An example of a split-axis transmission is described in Ser. No. 13/105,639, which is assigned to the present assignee and is specifically incorporated by reference. A primary power source (not shown), such as an engine or motor, may be connected to input shaft 110 through a primary input shaft coupling. The hybrid transmission 100 includes couplings to couple a secondary power source to input shaft 110. Alternatively, the hybrid transmission may include couplings to couple a secondary power source to output shaft 160. The secondary power source may be any of a variety of power sources, including electric, hydraulic, pneumatic, or mechanical power sources. For example, the secondary power source may be an electric motor, a hydraulic motor, a pneumatic motor, a flywheel, a spring, or an alternative fueled engine, such as a Sterling cycle engine.

The hybrid transmission 100 also includes two torque paths 120, 130 that define alternative, parallel torque paths between the input shaft 110 and the output shaft 160. Each of the torque paths 120, 130 includes a planetary gear set 140, 150 that control engagement of the torque path 120, 130 to provide for torque flow from the input shaft 110 to the output shaft 160 at a particular gear ratio. For example, planetary gear set 140 may engage torque path 120 to transmit torque from the input shaft 110 to the output shaft 160, while planetary gear set 150 disengages to prevent torque flow through torque path 130, and vice versa.

The secondary power source may provide torque independent of a primary power source or simultaneously with a primary power source when the secondary power source is coupled to input shaft 110 or output shaft 160. The secondary power source may also recover torque from input shaft 110 or output shaft 160 to aid in reducing the rotation of output shaft 160, which may reduce the speed of any attached drive axles or vehicles. Energy recovered by the secondary power source may be stored for later use or may be converted for use in a variety of applications. The torque provided may flow to output shaft 160 through either torque path 120 or torque path 130, depending on the engagement of planetary gear sets 140, 150.

Allowing a secondary power source to provide torque to input shaft 110 provides the benefit of reducing the torque required from the primary power source, which may improve fuel economy if the primary power source is a combustion engine. Fuel economy may be improved during transient conditions by allowing the primary power source to accelerate along the optimal brake specific fuel consumption curve, while the secondary power source may provide any additional torque required to meet the operator demand. Similarly, fuel economy may be improved by using the secondary power source to provide some of the required torque, allowing the primary power source to take advantage of lean air/fuel ratio control, homogeneous charge compression ignition, higher compression ratios, alternative engine cycles, such as the Atkinson cycle, and other efficiency improvements that reduce the combustion engine power requirement. Utilizing torque from the secondary power source may improve fuel economy by reducing the idle speed of the primary power source, allowing deactivation of primary power source cylinders, or by allowing the primary power source to be shut off completely.

Primary power source emissions may be improved when a portion of the total torque requirement is supplied by the secondary power source. Primary power source start-up acceleration emissions can be reduced by using the secondary power source to rotate input shaft 110 and the primary power source at the start speed of the primary power source, which may reduce the need for start-up acceleration. Also, for Otto cycle primary power source engines, low load emissions during start-up may be reduced by utilizing the secondary power source to increase the inertial load placed on the primary power source, which may minimize catalytic converter light-off time.

Coupling a secondary power source to a split-axis transmission may enhance the drivability of a vehicle with a split-axis transmission hybrid system. For example, providing a portion of the total torque required from a secondary power source may reduce delays felt by a vehicle operator during primary power source transient conditions, such as turbocharger lag, throttle response delays, or combustion engine lugging. Also, gear ratio engagement delays, such as transitioning from drive to reverse or reverse to drive, may be minimized if torque from the secondary power source is used for the initial launch during transmission engagement and prior to full engagement of the transmission. Using torque from the secondary power source to supplement the primary power source may assist with early up-shifts, which allows the transmission to operate more often in higher, more efficient, gear ratios. Similarly, coupling the secondary power source to the primary power source may reduce the need to down-shift during transient conditions. Drivability may also be enhanced by eliminating or reducing driveline torque disturbances and noise when the primary power source is supplemented with torque from the secondary power source. Additionally, coupling the secondary power source to output shaft 160 may enhance performance and reduce gear ratio change disturbance by providing fill-in torque during gear ratio changes.

The secondary power source may be decoupled from input shaft 110 or output shaft 160 when it is not providing or recuperating torque. This may allow the secondary power source to remain at zero speed, which may minimize any parasitic losses associated with rotating the secondary power source. If the secondary power source is a hydraulic motor, decoupling the secondary power source may prevent operating the hydraulic motor at high speeds, where its efficiency may be lower. Decoupling the secondary power source may also limit the rotational inertia of input shaft 110 to aid in acceleration.

Figure 2:
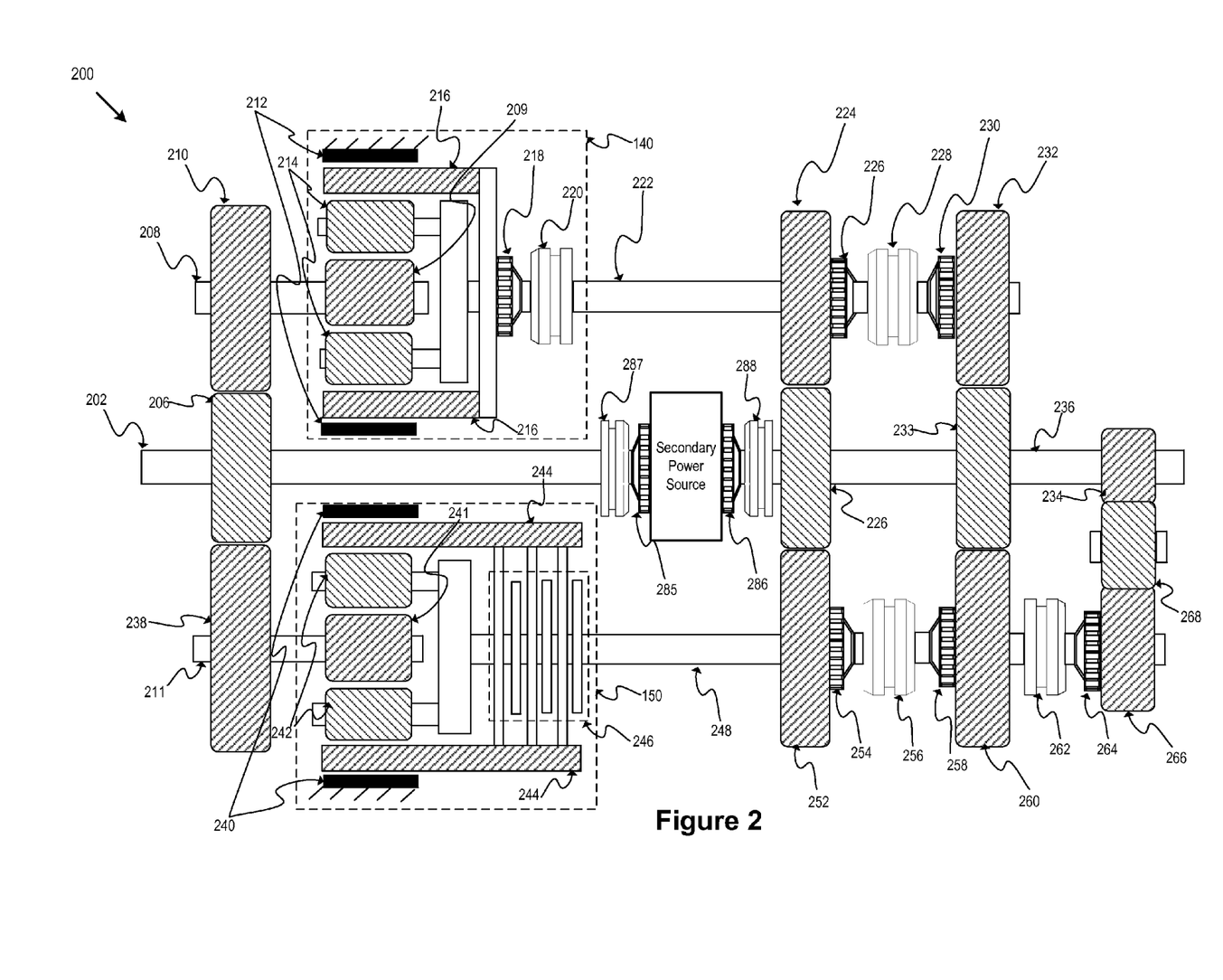
FIG. 2 is a mechanical illustration of a split-axis transmission hybrid system according to another embodiment of the invention.

FIG. 2 shows a mechanical implementation of a split-axis transmission hybrid system according to another embodiment of the invention. Hybrid transmission 200 includes input shaft 202, planetary gear sets 140 and 150, intermediate shafts 222 and 248, and gears 224, 232, 252, 260 and 266 used to transmit torque to output shaft 236. Torque may be provided to input shaft 202 from a primary power source (not shown) through a primary input shaft coupling. A secondary power source may be coupled to input shaft 202 through a secondary input shaft coupling and to output shaft 236 through a secondary output shaft coupling.

Input clutch 285 and output clutch 286 and synchronizers 287, 288 may serve to decouple the secondary power source from input shaft 202 and output shaft 236, respectively. Gear ratios may be determined by actuating band brakes 212 and 240, clutches 218, 246, 226, 230, 254, 258, and 264, and synchronizers 220, 228, 256, and 262. Gear 234 may be meshed with intermediate gear 268, which may be meshed with gear 266 to provide the reverse ratio. Planetary gear sets 140 and 150 include primarily ring gears 216 and 244, planet gears 214 and 242, and sun gears 209 and 241, respectively. Depending on the state of band brake 212 and band brake 240, torque may flow to gear 210 or gear 238.

In FIG. 2, the odd-numbered gear ratios, e.g., first, third, fifth, and seventh, may be implemented by engaging planetary gear set 140 and transmitting torque via intermediate shaft 222, while the even numbered gear ratios, e.g., second, fourth, sixth, and eighth, as well as reverse, may be implemented by engaging planetary gear set 150 and transmitting torque via intermediate shaft 248. Generally, only one of planetary gear sets 140 and 150 is engaged to couple torque at any given time. Such a configuration in which odd ratios are located on a first shaft and even ratios are located on a second shaft may be advantageous because gear ratios may be preselected on an unengaged shaft while the other shaft is transmitting torque.

The embodiment in FIG. 2 represents the preferred arrangement of adding a single secondary power source to the split-axis transmission hybrid system. A division in the split-axis transmission between the input gear set, such as planetary gears 140, and the output gear set, such as gears 224, 230, may provide for a simplified installation of the secondary power source in this location. In this embodiment, the secondary power source is located such that it may be coupled to either input shaft 202 through a secondary input shaft coupling or to output shaft 236 through a secondary output shaft coupling to allow the secondary power source to operate in its most efficient state while providing torque or recuperating torque. Coupling the secondary power source to input shaft 202 through a secondary input shaft coupling may allow use of an input clutch 285 in place of a torque converter, with the input clutch 285 placed between the primary power source and the secondary power source.

Mechanical locks may be activated when sun gears 209, 241 are in the fully applied position during primary power source start-stop and when the secondary power source is providing all the torque to the system. The mechanical locks may eliminate the need for oil pressure to maintain application of band brakes 212, 240, which is necessary to sustain a particular gear ratio. Utilizing mechanical locks to maintain band brakes 212, 240 may allow the use of a mechanically driven transmission oil pump (not shown). The mechanically driven transmission oil pump may be powered by either input shaft 202 or output shaft 236. When the secondary power source is providing all the torque to the system, the mechanically driven transmission oil pump may rotate at the speed of either input shaft 202 or output shaft 236 to supply transmission lubrication and to allow the hydraulic controls to operate.

The controlling components for changing the gear ratio (e.g., band brakes 212 and 240, synchronizers 220, 228, 256, and 262, and clutch 246) may be actuated either electrically, pneumatically, or hydraulically. For example, electrical actuation may be desirable when the secondary power source is an electric motor. In electrically actuated systems, the transmission may require oil only for lubrication, and an electrically driven oil pump may be used to pressurize the lubrication circuits.

Gear ratios (not shown) may be added between the secondary power source and input clutch 285 and output clutch 286 to allow the secondary power source to operate at a speed different than input shaft 202 and output shaft 236. This may allow the secondary power source to operate in an optimal speed/torque range without impacting the gear ratios transferring power from the primary power source to output shaft 236.

An alternative arrangement for including a single secondary power source to the split-axis transmission hybrid system is to couple the secondary power source to either the odd-numbered gear torque path, consisting of planetary gear set 140 and shaft 222, or the even-numbered gear torque path, consisting of planetary gear set 150 and shaft 248. However, this alternative arrangement may not be an optimal solution because the secondary power source would be able to provide torque in only about half of the available gear ratios, which would limit the benefits of adding a secondary power source.

Figure 3:
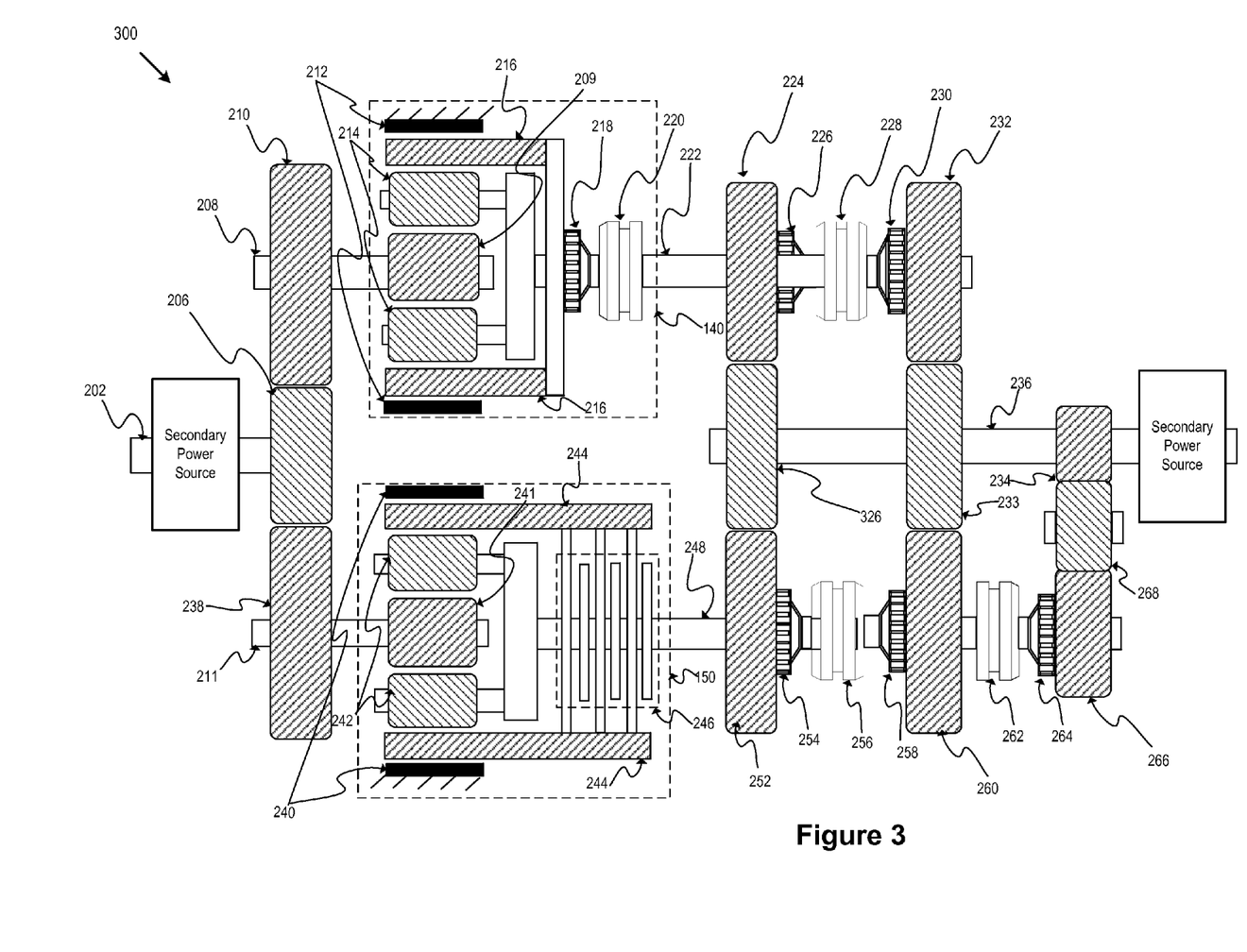
FIG. 3 is a mechanical illustration of a split-axis transmission hybrid system according to another embodiment of the invention.

FIG. 3 shows a mechanical implementation of a split-axis transmission hybrid system according to another embodiment of the invention. In this embodiment of the invention two secondary power sources are coupled to hybrid transmission 300. The layout of the split-axis transmission may allow for adding a secondary power source on both the input and output sides of the transmission. A first secondary power source is coupled to input shaft 202 through a secondary input shaft coupling and a second secondary power source is coupled to output shaft 236 through a secondary output shaft coupling. Either secondary power source may be coupled to its respective shaft through a clutch, or other commonly known detachable coupling device. Hybrid transmission 300 includes planetary gear sets 140 and 150, intermediate shafts 222 and 248, and gears 224, 232, 252, 260 and 266 used to transmit torque to output shaft 236.

The first secondary power source, coupled with input shaft 202 may replace the torque converter typically included in an automatic transmission. The first secondary power source also may provide the previously discussed benefits of improving fuel economy, reducing emissions, and enhancing drivability by providing some or all of the torque required, which reduces the torque required from the primary power source.

The second secondary power source, coupled with output shaft 236 through a secondary output shaft coupling may allow smoother gear ratio changes by dampening the inertial phase of the gear shift. The second secondary power source may also provide the previously discussed benefit of enhancing the drivability of a vehicle with a split-axis transmission hybrid system by providing torque directly to output shaft 236 during gear ratio changes. The second secondary power source may maintain delivery of some torque to output shaft 236 when torque from input shaft 202 is not available during gear ratio changes or for any other reason.

Alternatively, the second secondary power source may be installed directly on either the odd-numbered gear torque path, consisting of planetary gear set 140 and shaft 222, or the even-numbered gear torque path, consisting of planetary gear set 150 and shaft 248. The second secondary power source may be installed between planetary gear sets 140, 150 and gears 224, 252. Installing the second secondary power source in this location may provide a means of stepping-up the second secondary power source torque through the use of gear 224, 232, 252, 260, 266. However, this alternative arrangement may not be an optimal solution because the second secondary power source would be able to provide torque in only about half of the available gear ratios, which may limit the benefits of adding a second secondary power source.

Figure 4:
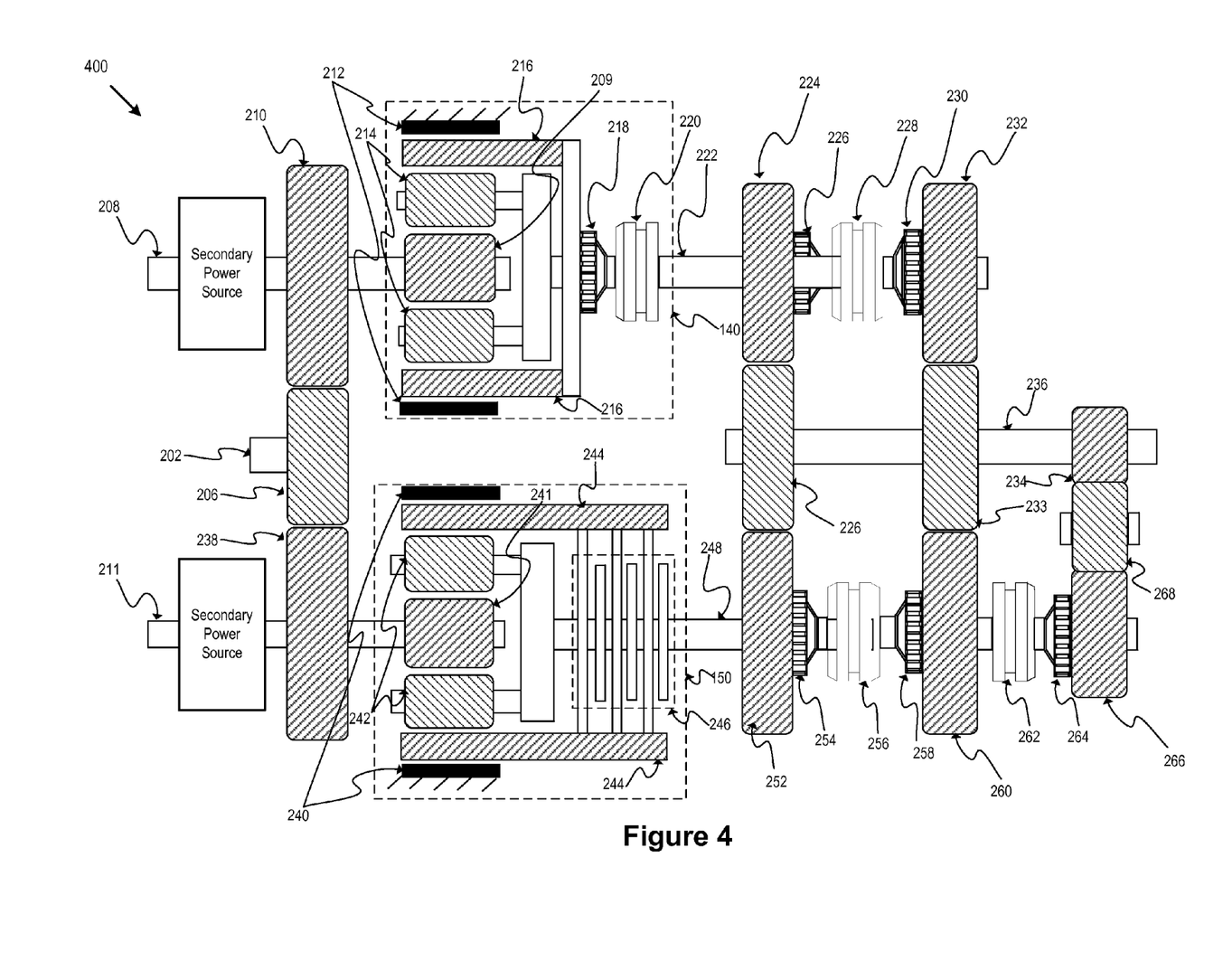
FIG. 4 is a mechanical illustration of a split-axis transmission hybrid system according to another embodiment of the invention.

FIG. 4 shows a mechanical implementation of a split-axis transmission hybrid system according to another embodiment of the invention. In this embodiment of the invention two secondary power sources are coupled to hybrid transmission 400, one on each gear torque path. Preferably, a first secondary power source is coupled to the odd-numbered gear torque path at shaft 208 through a secondary first torque path coupling and a second secondary power source is coupled to the even-numbered gear torque path at shaft 211 through a secondary second torque path coupling. Alternatively, the secondary power sources could be installed between planetary gear sets 140, 150 and gears 224, 252. Either secondary power source may be coupled to its respective shaft through a clutch, or other commonly known detachable coupling device. Hybrid transmission 400 also includes input shaft 202, planetary gear sets 140 and 150, intermediate shafts 222 and 248, and gears 224, 232, 252, 260 and 266 used to transmit torque to output shaft 236.

Including secondary power sources on each torque path may allow for synchronized gear ratio changes. Torque supplied from the secondary power sources may be switched from one secondary power source to the other in anticipation of the gear ratio change, ensuring torque flow to output shaft 236 remains relatively stable. Coupling secondary power sources to each torque path may also provide the previously discussed benefits of improving fuel economy, reducing emissions, and enhancing drivability by providing some or all of the torque required, which reduces the torque required to be supplied from the primary power source.

The preferred arrangement of coupling secondary power sources to shafts 208, 211 provides the broadest range of control. Alternatively, band brakes 212, 240 could be removed to provide both synchronized gear ratio changes and variable ratio operation. However, the preferred arrangement shown in FIG. 4 may be more efficient because the secondary power sources may not have to hold sun gears 209, 241 stationary during fixed gear operation.

An alternative arrangement to adding a secondary power source on each torque path may be to use a single secondary power source coupled to both torque paths. The single secondary power source could be coupled to shafts 208, 211 through two clutches to allow the torque from the secondary power source to switch from one torque path to the other. This alternative arrangement may provide the same benefits as coupling a secondary power source to each torque path, with the added benefits of reducing cost and improving efficiency by requiring only one secondary power source. However, the alternative arrangement may complicate the mechanical aspects of the hybrid transmission.

A comparison of the benefits of split-axis transmission hybrid systems arrangements with single secondary power sources, as shown in FIGS. 1 and 2, and dual secondary power sources, as shown in FIGS. 3 and 4 is shown in Table 1. An "L" indicates limited functionality of the particular hybrid system benefit, while an "F" indicates full functionality of the particular hybrid system benefit. For example, a single secondary power source coupled to only one torque path provides limited functionality of synchronized shifting because the torque from the secondary power source can only supplement the primary power source when that particular torque path is engaged.

TABLE 1

Comparison of the Various Hybridized Split-Axis Transmission Configurations

| Number of Secondary Power Sources/Location | | Synchronized Shifting | CVT Mode | Torque Filling (gear ratio change) | Secondary Power Source Driving | Primary Power Source Start-Stop | Primary Power Source Loading | Enhanced Drivability |
|---|---|---|---|---|---|---|---|---|
| Single | Input Shaft | | | | F | F | F | F |
| | Output Shaft | | | F | F | L | L | F |
| | Combined Input/Output Shaft (FIG. 2) | | | F | F | F | F | F |
| | Single Torque Path | L | L | | L | | | L |
| Dual | Input & Output Shafts (FIG. 3) | | | F | F | F | F | F |

TABLE 1-continued

Comparison of the Various Hybridized Split-Axis Transmission Configurations

| Number of Secondary Power Sources/Location | Hybrid System Benefit | | | | | | |
|---|---|---|---|---|---|---|---|
| | Synchronized Shifting | CVT Mode | Torque Filling (gear ratio change) | Secondary Power Source Driving | Primary Power Source Start-Stop | Primary Power Source Loading | Enhanced Drivability |
| Each Torque Path (FIG. 4) | F | F | | F | F | F | F |
| Each Torque Path (alternative) | F | | L | F | F | L | F |

Table 1 demonstrates that, among the single secondary power source options, the arrangement with the secondary power source coupled to both the input shaft and output shaft, as shown in FIG. 2, may offer the most hybrid system functionality. Table 1 also demonstrates that, among the dual secondary power source options, the arrangement with the a secondary power source coupled to each torque path with band brakes 212, 240 included, as shown in FIG. 4, may offer the most hybrid system functionality. This dual secondary power source arrangement offers the benefit of synchronized gear shifting. This arrangement also offers the benefit of continuously variable transmission ("CVT") type functionality, which maximizes the efficiency or performance of the primary power source by allowing it to operate closer to its most efficient speed or peak power speed, independent of the rotational speed of the output shaft.

Figure 5:
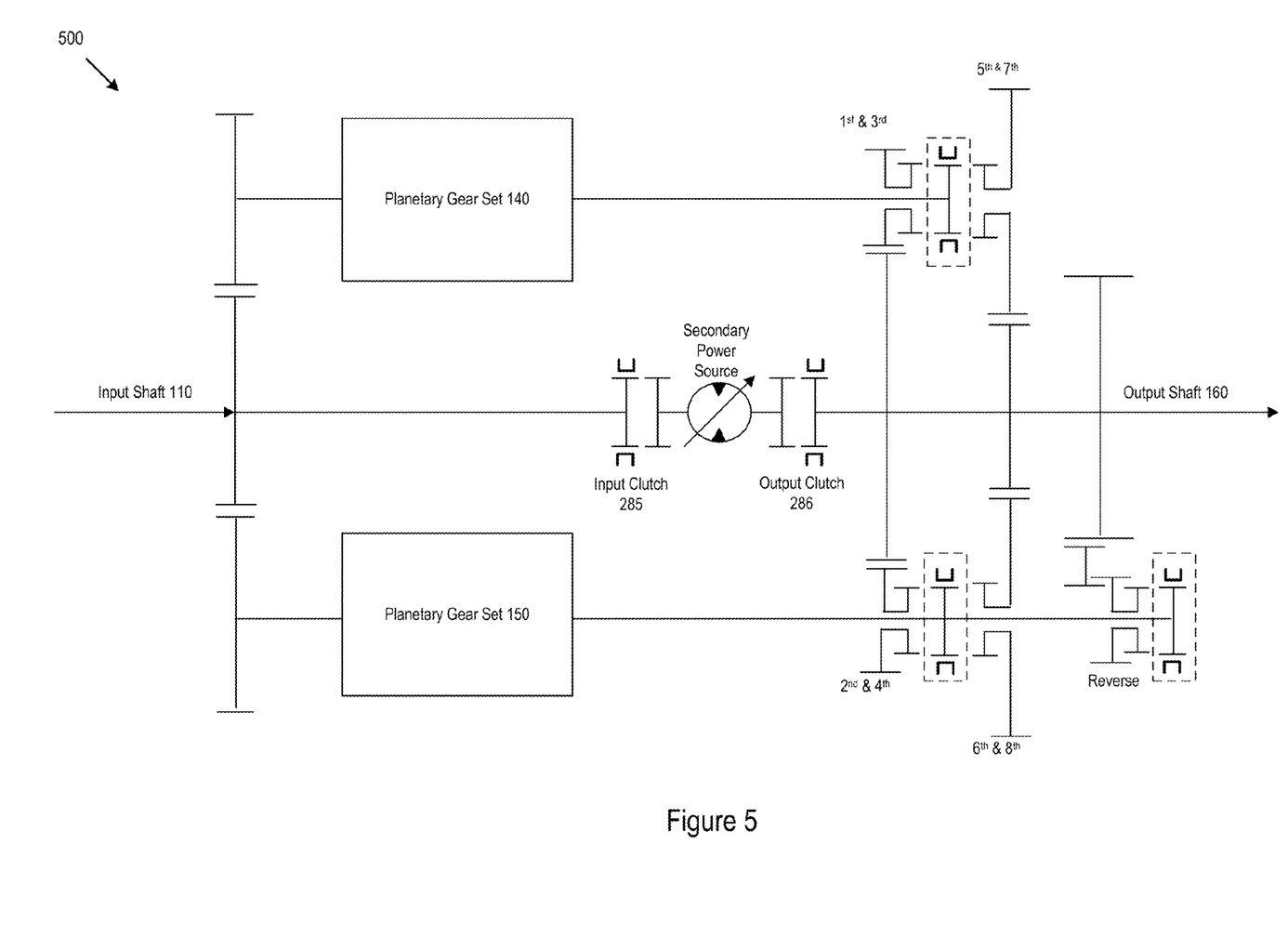
FIG. 5 is a schematic diagram of a split-axis transmission hybrid system according to another embodiment of the invention.

FIG. 5 shows a schematic diagram of a split-axis transmission hybrid system according to another embodiment of the invention. In this embodiment of the invention the secondary power source may be a hydraulic motor. Hybrid transmission 500 includes a secondary power source coupled to both input shaft 110 and output shaft 160. Input clutch 285 and output clutch 286 serve to decouple the secondary power source from input shaft 110 and output shaft 160, respectively.

When the rotational speeds of the power sources are relatively low, such as during slow speed urban driving applications, the hydraulic secondary power source may be active. As the rotational speeds increase, such as during higher speed highway driving applications, the efficiency of the hydraulic secondary power source may decrease. The hydraulic secondary power source may then be shutdown and input clutch 285 and output clutch 286 may be released to decouple the hydraulic secondary power source from the torque path. A conventional mechanical torque path may be utilized during high rotational speed applications to maximize efficiency.

The hybrid transmission may be operated in parallel, series, or combined hybrid configurations. A combined hybrid configuration may operate as a series hybrid at low rotational speeds, with only the secondary power source providing torque. At higher rotational speeds, the combined hybrid configuration may operate as a parallel hybrid, utilizing the primary power source and mechanical torque path, as well as the secondary power source.

A split-axis transmission hybrid system may be configured with two different gear ratio pre-selection configurations, distinct and concurrent. Examples of distinct and concurrent preselection split-axis transmissions are disclosed in Ser. No. 13/105,693, which is assigned to the present assignee and is specifically incorporated by reference. Preselection of gear ratios occurs when the next gear ratio that is expected to be used is preselected in preparation for the next gear ratio change. Preselection may involve the process of first predicting the next desired gear ratio, and then altering the configuration of the disengaged torque path 120 or 130 to provide for the next gear ratio by moving components into place before the actual gear shift occurs. This preselection mechanism may provide the benefit of efficient, smooth gear changes because the transmission does not have to shift into neutral by disconnecting the input shaft 110 from the drive mechanism by use of a launch device.

Figure 6:
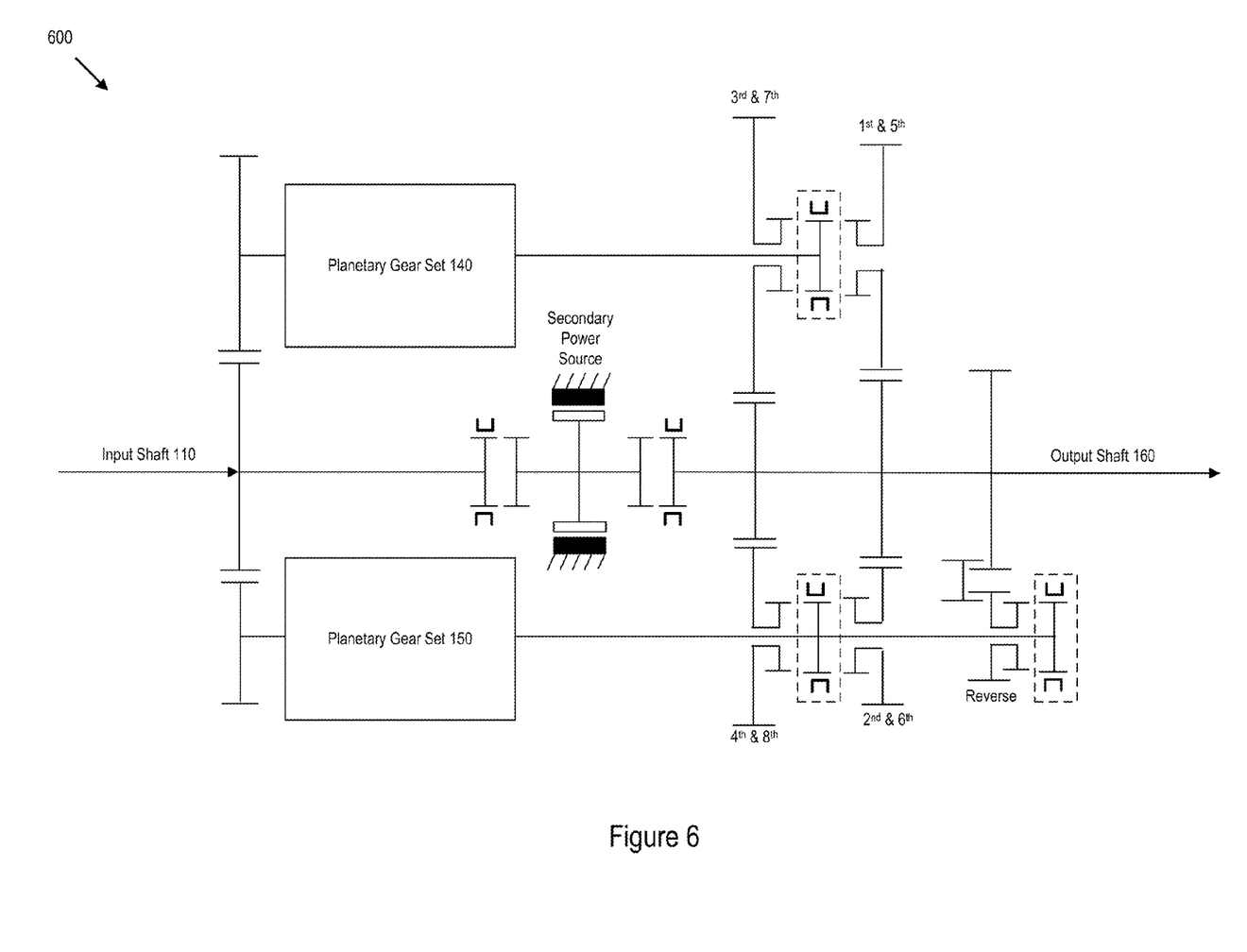
FIG. 6 is a schematic diagram of a distinct preselection split-axis transmission hybrid system according to another embodiment of the invention.

FIG. 6 shows a schematic diagram of a split-axis transmission hybrid system employing distinct preselection according to another embodiment of the invention. In distinct gear ratios arrangements, two gear ratios on any given synchronizer are spaced as far apart as allowed by the total number of gears. An example synchronizer actuator mapping for distinct preselection is shown in Table 2. The example distinct preselection mapping shown in Table 2 may also be applicable for use in a dual-clutch transmission application, where each actuator controls one to two gear ratios.

TABLE 2

Distinct Preselection Synchronizer Mapping of Each Gear

| Number of Gears | Odd Axis | | | Even Axis | | |
|---|---|---|---|---|---|---|
| | Sync. 1 | Sync. 3 | Sync. 5 | Sync. 2 | Sync. 4 | Sync. 6 |
| 5-Speed | 1-5 | 3 | | 2 | 4-R | |
| 6-Speed | 1-5 | 3 | | 2-6 | 4-R | |
| 7-Speed | 1-5 | 3-7 | | 2-6 | 4-R | |
| 8-Speed | 1-5 | 3-7 | | 2-6 | 4-8 | R |
| 9-Speed | 1-7 | 3-9 | 5 | 2-6 | 4-8 | R |
| 10-Speed | 1-7 | 3-9 | 5 | 2-8 | 4-10 | 6-R |
| 11-Speed | 1-7 | 3-9 | 5-11 | 2-8 | 4-10 | 6-R |

In any distinct preselection application, gear ratio change time may be minimized by spacing the gear ratios that a given actuator controls as far apart as possible. Spacing all the gear ratios an equal distance apart ensures that all preselection delays are constant. Spacing the gear ratios as far apart as possible may allow for a faster gear ratio change if there is an unexpected event during the gear ratio change, such as a sudden increase or decrease in acceleration. Gear ratio change time is decreased by minimizing the movement that any given actuator must travel during preselection and gear ratio selection. If an unexpected event occurs during the gear ratio change, the gear ratio that was preselected may move from the preselected position to the neutral position and the new gear ratio may require its actuator to travel from the neutral position to the new gear ratio.

Distinct preselection requires enhanced control logic to predict the best preselection gear ratio. If an incorrect gear ratio is preselected, the selection mechanism may need to move to another gear set, which may require disengaging a clutch from one set of gear ratios, shifting axially to the other set of gear ratios that the particular actuator controls, then engaging the other set of gear ratios. This may result in the maximum possible delay during an unexpected gear ratio change event because it requires fully stroking the actuator between its extreme most engagement positions.

Distinct preselection in the split-axis transmission hybrid system may have the benefit that the brakes may be used to engage the lower gears (higher numerical ratios) and the clutches may be used to engage the higher gears. For example, the first and third gears on the odd torque path have a common input element and the fifth and seventh gears on have a common input element. This may result in a more efficient clutch and brake design because band brake 212, 240 may control the lower numerical gear ratios and clutches 218, 246 may control the higher numerical gear ratios.

The gearing arrangement for the distinct preselection split-axis transmission hybrid system may result in a set of gear ratios which provide a nearly geometric ratio step pattern. Additional benefits are the planetary gear set sun-to-ring gear ratio is typical of a conventional automatic transmission and the braking of the planetary gear set is through the ring gear, which allows for using a brake band.

Figure 7:
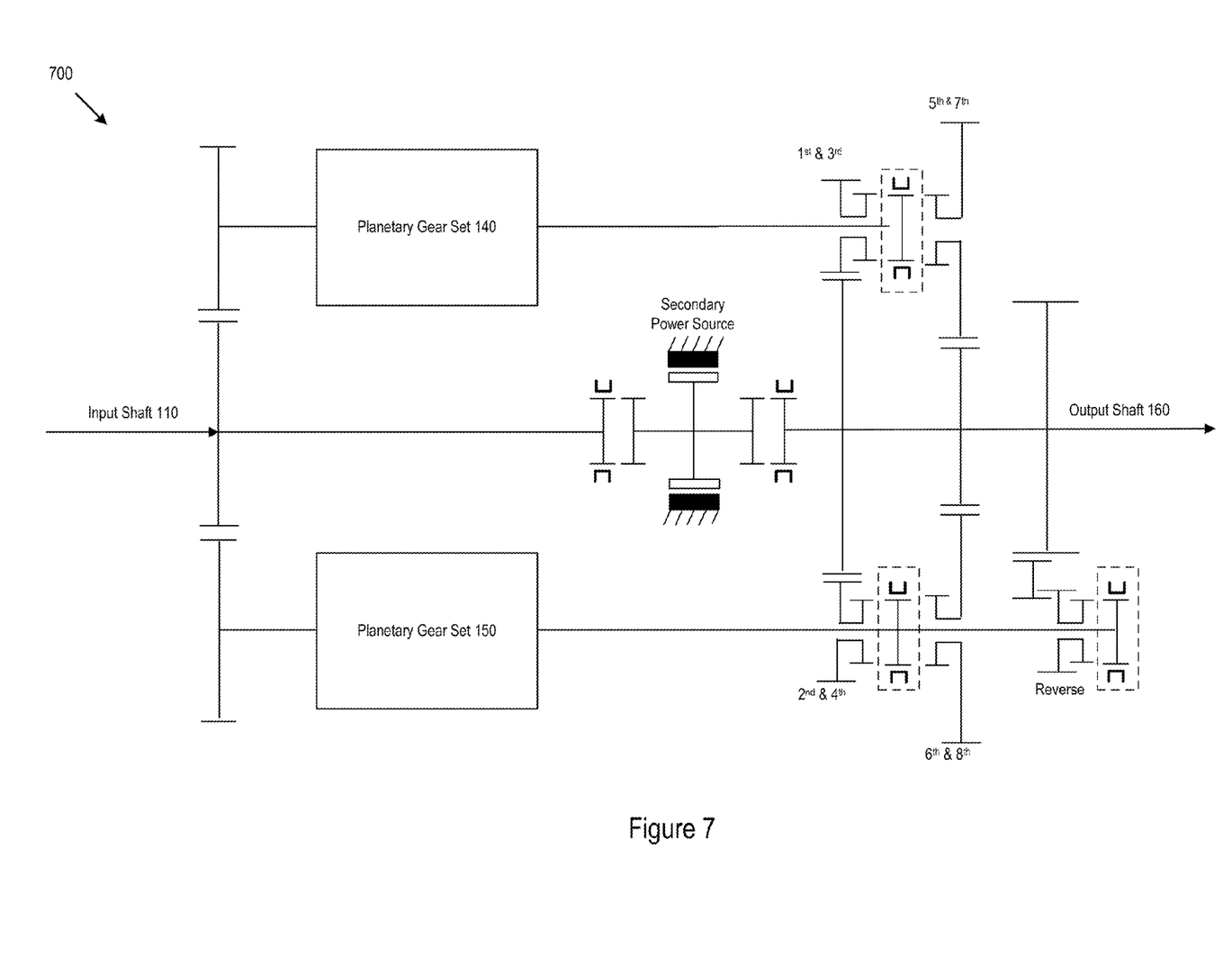
FIG. 7 is a schematic diagram of a concurrent preselection split-axis transmission hybrid system according to another embodiment of the invention.

FIG. 7 shows a schematic diagram of a split-axis transmission hybrid system employing concurrent preselection according to another embodiment of the invention. Concurrent preselection provides for simultaneous preselection of the next potential up-shift gear ratio and the next potential down-shift gear ratio, where the adjacent ratios to the current ratio are pre-selected. Concurrent preselection allows for less complex preselection logic, since for each preselection the adjacent up-shift and downshift gear ratio are available. In concurrent preselection, the need to change the preselected gear during an unexpected gear shift event is minimized because the next up or down gear is already preselected. An example synchronizer actuator mapping for concurrent preselection is shown in Table 3. In fifth and sixth gear, the concurrent mapping is not applicable due to the fact that only two gear ratios per actuator position are possible. However, the determination of the next gear ratio is then easier to predict in these higher gear ratios.

TABLE 3

Concurrent Preselection Synchronizer Mapping of Each Gear

| Number of Gears | Odd Axis | | | Even Axis | | |
|---|---|---|---|---|---|---|
| | Sync. 1 | Sync. 3 | Sync. 5 | Sync. 2 | Sync. 4 | Sync. 6 |
| 5-Speed | 1-3 | 5 | | 2-4 | R | |
| 6-Speed | 1-3 | 5 | | 2-4 | 6-R | |
| 7-Speed | 1-3 | 5-7 | | 2-4 | 6-R | |
| 8-Speed | 1-3 | 5-7 | | 2-4 | 6-8 | R |
| 9-Speed | 1-3 | 5-7 | 9 | 2-4 | 6-8 | R |
| 10-Speed | 1-3 | 5-7 | 9 | 2-4 | 6-8 | 10-R |
| 11-Speed | 1-3 | 5-7 | 9-11 | 2-4 | 6-8 | 10-R |

Both Table 2 and Table 3 demonstrate that the most efficient utilization of synchronizer actuators occur with a seven-speed transmission and eleven-speed transmission. However, if an under-drive gear ratio is desired, then a six-speed transmission would provide both actuator and packaging utilization efficiency. The Sync. 3 actuator would be used to engage the under-drive gear ratio, if one was incorporated.

For conventional powertrains, the transmission package space may be most efficiently used when an odd number of gear ratios are incorporated, plus, either an under-drive, prime ratio, or an additional over-drive gear on the odd axis. However, the most efficient package space may be an even number of ratios for pure electric powertrains because a reverse ratio is unnecessary.

The concurrent preselection split-axis transmission hybrid system may provide the best arrangement in regard to gear ratio preselection because the adjacent up-shift and down-shift of the current gear ratio are both available. The disadvantage of this arrangement may be that the smoothness of the gear ratio steps is difficult to design for wide configurations, and the input friction elements must be sized for both the lowest and the highest numerical ratio, which may result in over-design of the elements and added cost. An additional disadvantage may be that the sun gear-to-ring gear ratio is more difficult to achieve. In the distinct preselection arrangement, the stationary ratio may be above 3:1, while the concurrent arrangement may results in a stationary ratio of less than 1.7:1.

Figure 8:
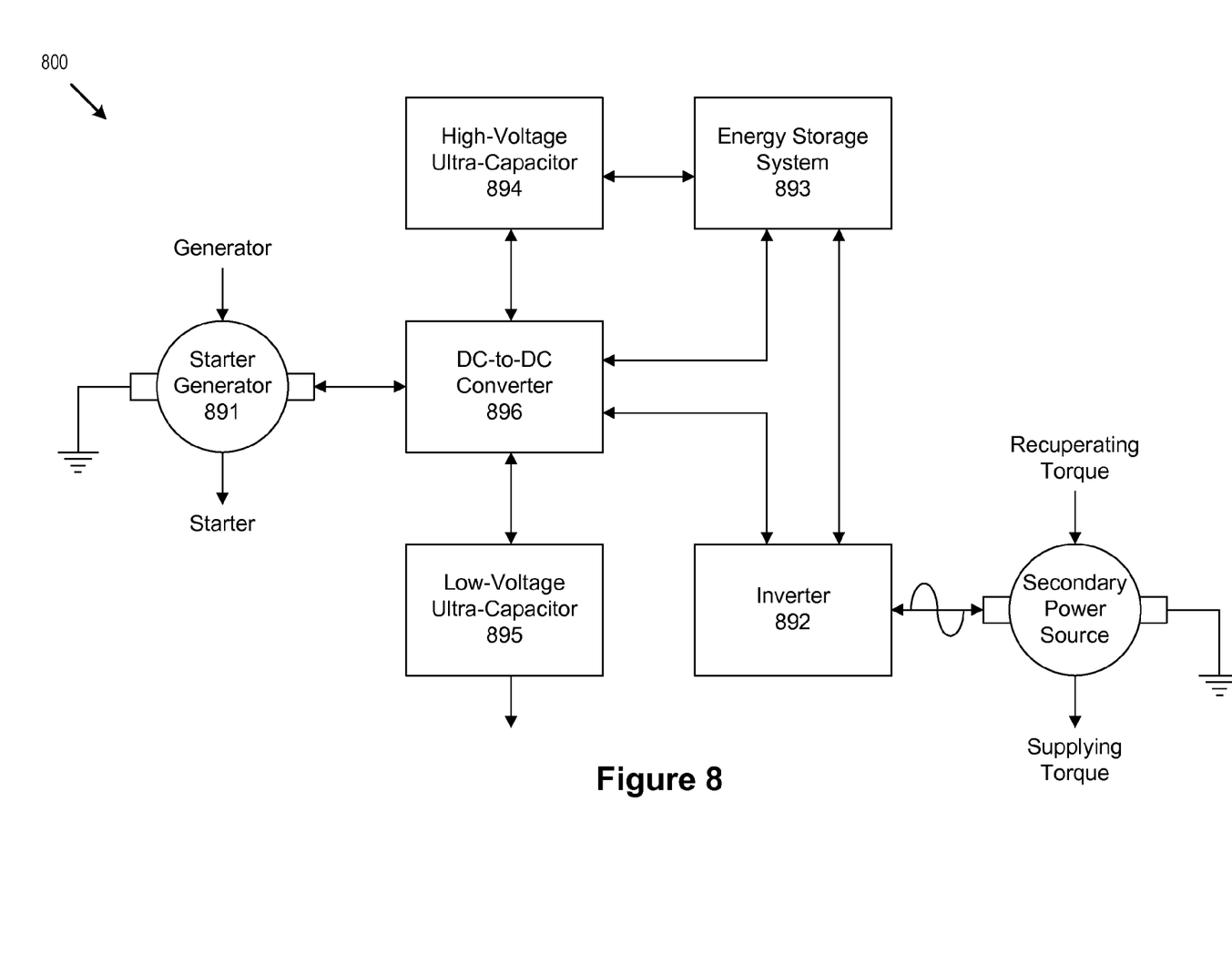
FIG. 8 is a block diagram of the electrical system of a split-axis transmission hybrid system according to another embodiment of the invention.

FIG. 8 shows the electrical system for the split-axis transmission hybrid system. The electrical system 800 may include starter-generator 891, inverter 892, energy storage system 893, high-voltage capacitor 894, low-voltage capacitor 895, and direct current-to-direct current ("DC-to-DC") converter 896. Starter-generator 891 is preferably coupled to the primary power source. Starter-generator 891 may enhance the system's state of charge control and allow the secondary power source added flexibility in providing torque to a drive axle. The addition of starter-generator 891 may require replacement of the commonly used ribbed belt with a cog type accessory belt drive to allow for positive application of torque to and from the primary power source. Starter-generator 891 may be liquid cooled due to its higher power demands. Starter-generator 891 may be connected in-line with the secondary power source cooling circuit.

In vehicles with a split-axis transmission hybrid system, the low-voltage battery system commonly found in vehicles may be replaced with low-voltage capacitor 895. Low-voltage capacitor 895 may be separated from the high-voltage system through a DC-to-DC converter 896. The circuitry of DC-to-DC converter 896 may provide for isolation between high-voltage energy storage system 893 and starter-generator 891. In the event there is a high-voltage failure, the isolation may allow the primary power source to continue operation and starter-generator 892 can supply the low-voltage electrical requirements of the vehicle. Without the isolation provided by the DC-to-DC converter 896, a failure that results in a fault may also severely impact the operation of the primary power source because starter-generator 891 may not be able to meet the low-voltage power requirements.

A DC-to-DC converter 896 may not be necessary if the secondary power source is a hydraulic motor. In such an application starter-generator 891 may be a low-voltage component, which is coupled to low-voltage capacitor 895 or battery (not shown).

An energy storage system for a vehicle with an electric motor secondary power source may be preferably designed with a buffering mechanism such that the high-voltage battery may be charged and discharged at its most efficient rate for a given battery condition. Due to the internal resistance of the battery, a charging rate that is too low will result in inefficient charging, generating heat within the electric motor and transferring only small amounts of current to the battery. Conversely, high charging rates may also be inefficient because the current flowing into the battery may raise its temperature, wasting significant energy in the form of heat. Allowing the battery to charge and discharge efficiently may enhance the throughput efficiency of the energy storage system and may extend the life of the high-voltage battery. As shown in FIG. 8, the energy storage system buffer may be high-voltage capacitor 894 connected in a series/parallel arrangement with energy storage system 893. High-voltage capacitor 894 may have a very low resistance relative to the battery, allowing it to be used when the charging rate is high. The energy in high-voltage capacitor 894 can either remain within high-voltage capacitor 894 or it can be transferred to the battery at a lower, more efficient, charging rate. The buffer may be bypassed when energy storage system 893 charge/discharge requirements are within the high-efficiency throughput bounds. Alternatively, the buffer may be an electric flywheel.

The preferred limited operating strategy in the event of a low-voltage system fault may designate the second, sixth, and reverse gear ratios as default. The gear ratio selected when the low-voltage fault occurs may define whether the second or sixth gear is selected as the default gear. If the transmission is operating at or above fourth gear when the low-voltage fault occurs, the sixth gear ratio may be designated as the default gear ratio so the primary power source speed is not forced into a speed limiter. If the sixth gear is designated as the default gear a latching valve may be used to allow the hybrid transmission to remain in a high numerical ratio at high speeds. The hybrid transmission may force a down-shift to second gear once the system pressure is below the predetermined threshold of the latching valve. As the primary power source speed and associated oil pressure reduce, the hybrid transmission may automatically downshift to second gear, where the hybrid transmission may remain as long as the vehicle operator maintains the vehicle in the drive gear setting. The reverse, park, and neutral gear settings may be selected through a manual mechanical valve.

It may be necessary to maintain a mechanical link to the hybrid transmission during a fault in order to allow for mechanical selection of the park, reverse, neutral, and drive gear settings. Only the drive gear ratios may be available during a low-voltage fault if there is no mechanical link to the transmission. The mechanical link provides the vehicle operator with the ability to select the park, reverse, neutral, and drive gear settings regardless of the operability of the transmission controller.

The preferred limited operating strategy in the event of a high-voltage system fault may include a DC-to-DC converter capable of isolating the low-voltage circuit from the high-voltage energy storage system. The isolation may allow the low-voltage circuit to be supplied when a high-voltage battery fault occurs. If the high-voltage system faults, the low-voltage system operational time may be limited by the state of charge of the low-voltage battery, provided the alternator has been replaced by a high-voltage starter-generator.

A high-voltage system fault may require that vehicle launch occurs using the clutch (not shown) located between the primary power source and the hybrid transmission input shaft, provided a launch device has replaced a torque converter. This clutch can be modulated to provide an acceptably smooth clutch application even when the high-voltage system is unavailable because the low voltage circuit may still be active. Also, the hydraulic circuit for this clutch could be designed to allow modulation without any form of electrical input. The thermal capacity of the clutch to absorb heat during a launch may limit the launch device. The power transferred through the clutch during engagement may be minimized to limit heat generation because the secondary power source may be unavailable to synchronize the differential speed of the clutch during a high-voltage system fault.

Figure 9:
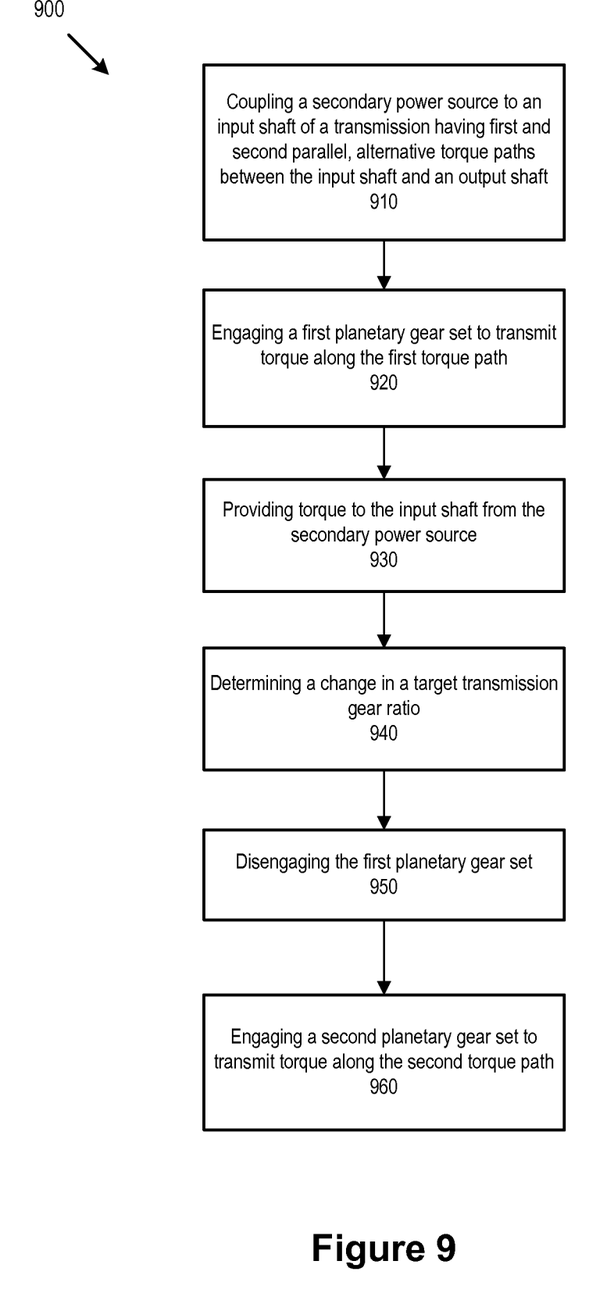
FIG. 9 is a flow diagram of a method for operating a split-axis transmission hybrid system according to another embodiment of the invention.

FIG. 9 illustrates method 900 for operating a split-axis transmission hybrid system according to another embodiment of the invention. The method begins with step 910 in which a secondary power source is coupled to the input shaft of a transmission having first and second parallel, alternative torque paths between the input shaft and an output shaft. Step 920 involves engaging a first planetary gear set to transmit torque along the first torque path. In step 930, torque is provided to the input shaft from the secondary power source. Step 940 involves determining if there is a change in a target transmission gear ratio. Step 950 involves disengaging the first planetary gear set. In step 960, the secondary planetary gear set is engaged to transmit torque along the second torque path.

Figure 10:
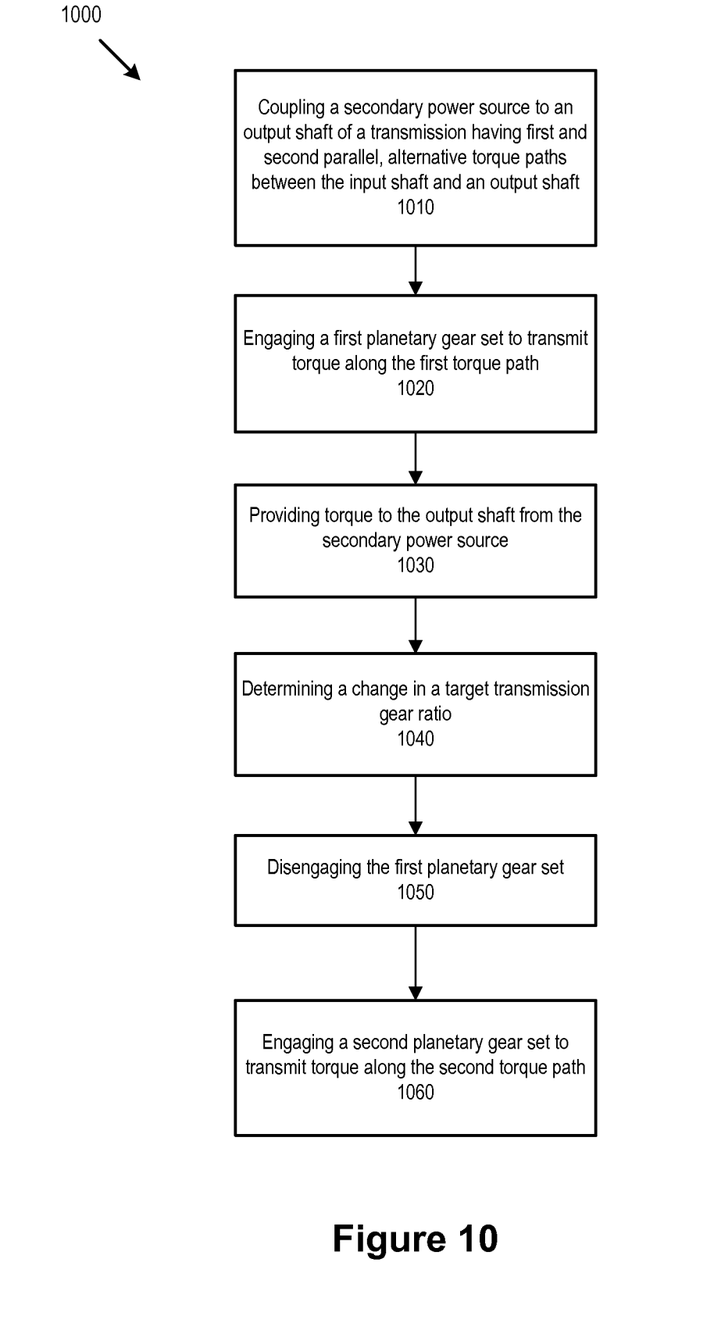
FIG. 10 is a flow diagram of a method for operating a split-axis transmission hybrid system according to another embodiment of the invention.

FIG. 10 illustrates method 1000 for operating a split-axis transmission hybrid system according to another embodiment of the invention. The method begins with step 1010 in which a secondary power source is coupled to the output shaft of a transmission having first and second parallel, alternative torque paths between the input shaft and an output shaft. Step 1020 involves engaging a first planetary gear set to transmit torque along the first torque path. In step 1030, torque is provided to the output shaft from the secondary power source. Step 1040 involves determining if there is a change in a target transmission gear ratio. Step 1050 involves disengaging the first planetary gear set. In step 1060, the secondary planetary gear set is engaged to transmit torque along the second torque path.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A transmission comprising:
   a first planetary gear set providing at least part of a first torque path from an input shaft to an output shaft;
   a second planetary gear set connected in parallel with the first planetary gear set and providing at least part of a second torque path from the input shaft to the output shaft;
   a plurality of gears configured to transmit torque selectively from the first torque path to the output shaft, and to transmit torque selectively from the second torque path to the output shaft; and
   a secondary input shaft coupling with the input shaft configurable to couple a secondary power source to the input shaft.

2. A transmission as in claim 1 further comprising a secondary output shaft coupling with the output shaft configurable to couple the secondary power source to the output shaft.

3. A transmission as in claim 2 wherein the secondary power source is configurable to be coupled to either the input shaft or the output shaft.

4. A transmission as in claim 2 wherein the secondary power source is configurable to be decoupled selectively from the input shaft and the output shaft.

5. A transmission as in claim 2 wherein the secondary output shaft coupling is further configurable to couple the secondary power source to the output shaft simultaneously with a primary power source coupled to the input shaft.

6. A transmission as in claim 1 wherein the secondary input shaft coupling is further configurable to couple the secondary power source to the input shaft simultaneously with a primary power source coupled to the input shaft.

7. A transmission as in claim 6 further comprising a primary input shaft coupling configurable to decouple the primary power source from the input shaft, wherein the transmission is configurable to transmit torque solely from the secondary power source via the secondary input shaft coupling.

8. A transmission as in claim 6 further comprising a starter-generator selectively configurable to provide torque to the primary power source and the secondary power source or to accept torque from the primary power source and the secondary power source.

9. A transmission as in claim 8 wherein the starter-generator is forcibly cooled.

10. A transmission as in claim 8 further comprising a low-voltage capacitor, a high-voltage capacitor, a direct current-to-direct current converter, and a high-voltage energy storage system in connection with the secondary power source.

11. A transmission as in claim 1 wherein the plurality of gears are configured to provide concurrent gear preselection.

12. A transmission as in claim 1 wherein the plurality of gears are configured to provide distinct gear preselection.

13. A transmission as in claim 1 wherein the secondary power source is selected from a group consisting of an electric motor, a hydraulic motor, and a flywheel.

14. A method of operating a transmission having first and second parallel, alternative torque paths between an input shaft and an output shaft, with a coupling for a primary power source with the input shaft and a coupling for a secondary power source with the input shaft, the method comprising:
 coupling the secondary power source to the input shaft;
 engaging a first planetary gear set to transmit torque along the first torque path;
 providing torque to the input shaft from the secondary power source;
 determining a change in a target transmission gear ratio;
 disengaging the first planetary gear set; and
 engaging a second planetary gear set to transmit torque along the second torque path.

* * * * *